United States Patent
Croak et al.

(10) Patent No.: US 8,243,912 B1
(45) Date of Patent: Aug. 14, 2012

(54) METHOD AND APPARATUS FOR PROVIDING TRANSACTION DATA IN A PACKET NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1813 days.

(21) Appl. No.: 11/190,600

(22) Filed: Jul. 27, 2005

(51) Int. Cl.
*H04M 3/50* (2006.01)
*H04L 12/66* (2006.01)

(52) U.S. Cl. .............. 379/265.01; 370/356; 379/265.09; 379/912

(58) Field of Classification Search ................. 379/67.1, 379/265.13, 265.01, 265.02, 265.09, 912; 370/356
See application file for complete search history.

(56) References Cited

U.S. PATENT DOCUMENTS

| | | | | |
|---|---|---|---|---|
| 4,797,818 A | * | 1/1989 | Cotter | 705/15 |
| 5,463,685 A | * | 10/1995 | Gaechter et al. | 379/210.01 |
| 6,141,413 A | * | 10/2000 | Waldner et al. | 379/88.17 |
| 6,751,296 B1 | * | 6/2004 | Albal et al. | 379/67.1 |
| 7,110,964 B2 | * | 9/2006 | Tengler et al. | 705/21 |
| 7,451,102 B2 | * | 11/2008 | Nowak | 705/26.35 |
| 2005/0049940 A1 | * | 3/2005 | Tengler et al. | 705/27 |

* cited by examiner

*Primary Examiner* — Harry Hong

(57) ABSTRACT

A method and apparatus for providing transaction data in a packet network is described. In one embodiment, at least one routed call is received. Transaction data is subsequently obtained from the at least one routed call. In turn, the transaction data is provided to an entity (e.g., a business or store) associated locally to the at least one routed call.

20 Claims, 4 Drawing Sheets

US 8,243,912 B1

METHOD AND APPARATUS FOR PROVIDING TRANSACTION DATA IN A PACKET NETWORK

BACKGROUND OF THE INVENTION

1. Field of the Invention

Embodiments of the present invention generally relate to telecommunications systems and, more particularly, to a method and apparatus for providing transaction data in a packet network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network. Within a VoIP network, Retailers with a local presence (e.g., a food delivery business) often have to purchase and maintain multiple phone lines to handle incoming customer calls. The cost that is involved with purchasing this equipment and providing telecommunication services for numerous store locations is considerable. Moreover, the queues that occur during busy hours for these local points of presence can also bring about customer dissatisfaction.

Thus, there is a need in the art for a method and apparatus for efficiently providing transaction data in a packet network.

SUMMARY OF THE INVENTION

In one embodiment, a method and apparatus for providing transaction data in a packet network is described. More specifically, at least one routed call is received by a call control element to a central call center. Transaction data is then subsequently obtained from the at least one routed call by a call center agent. In turn, the transaction data is provided by the call center agent to an entity (e.g., a business or store) that is associated locally to the routed call(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
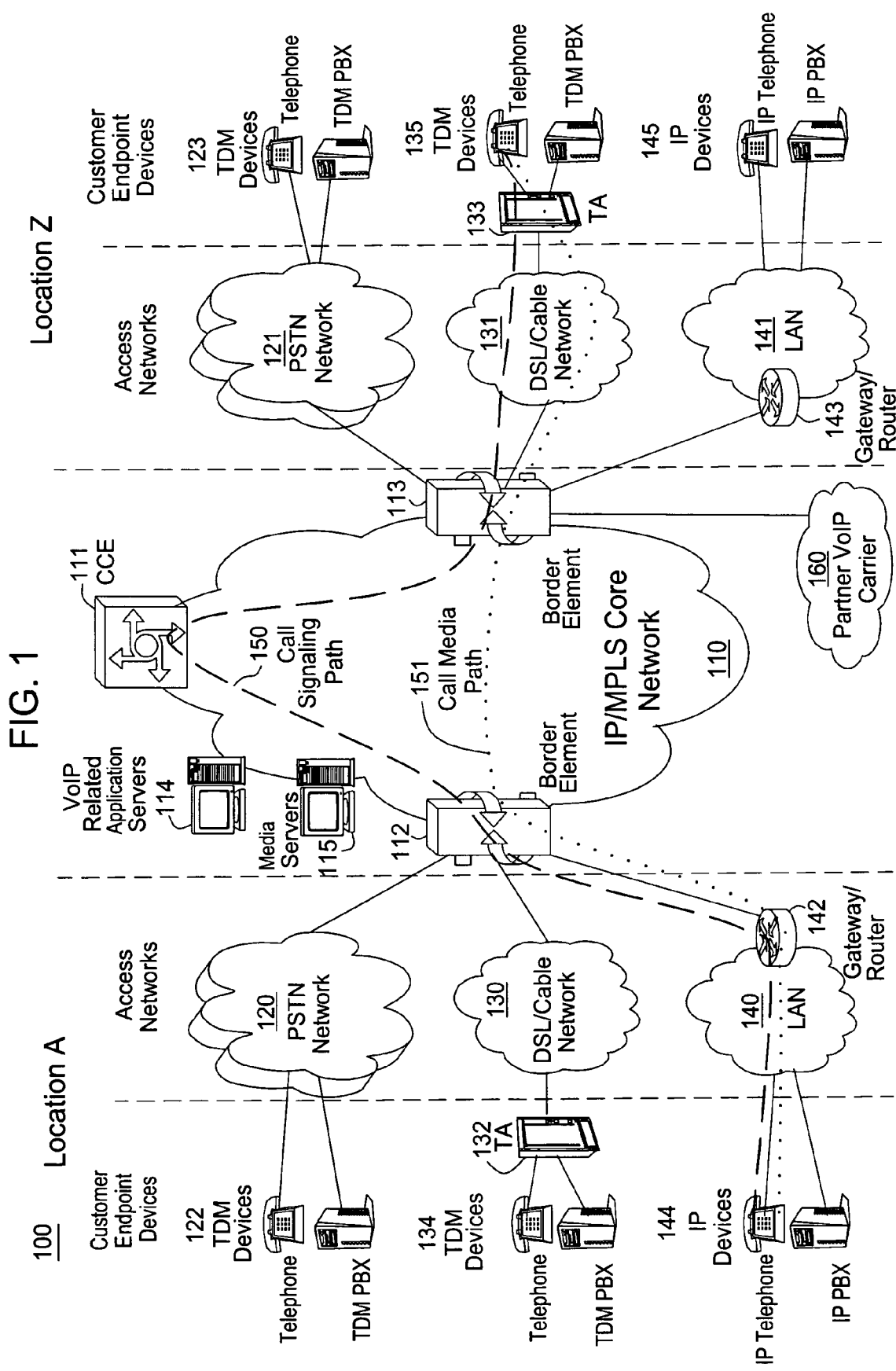
FIG. 1 is a block diagram depicting an exemplary embodiment of a communication system in accordance with the invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
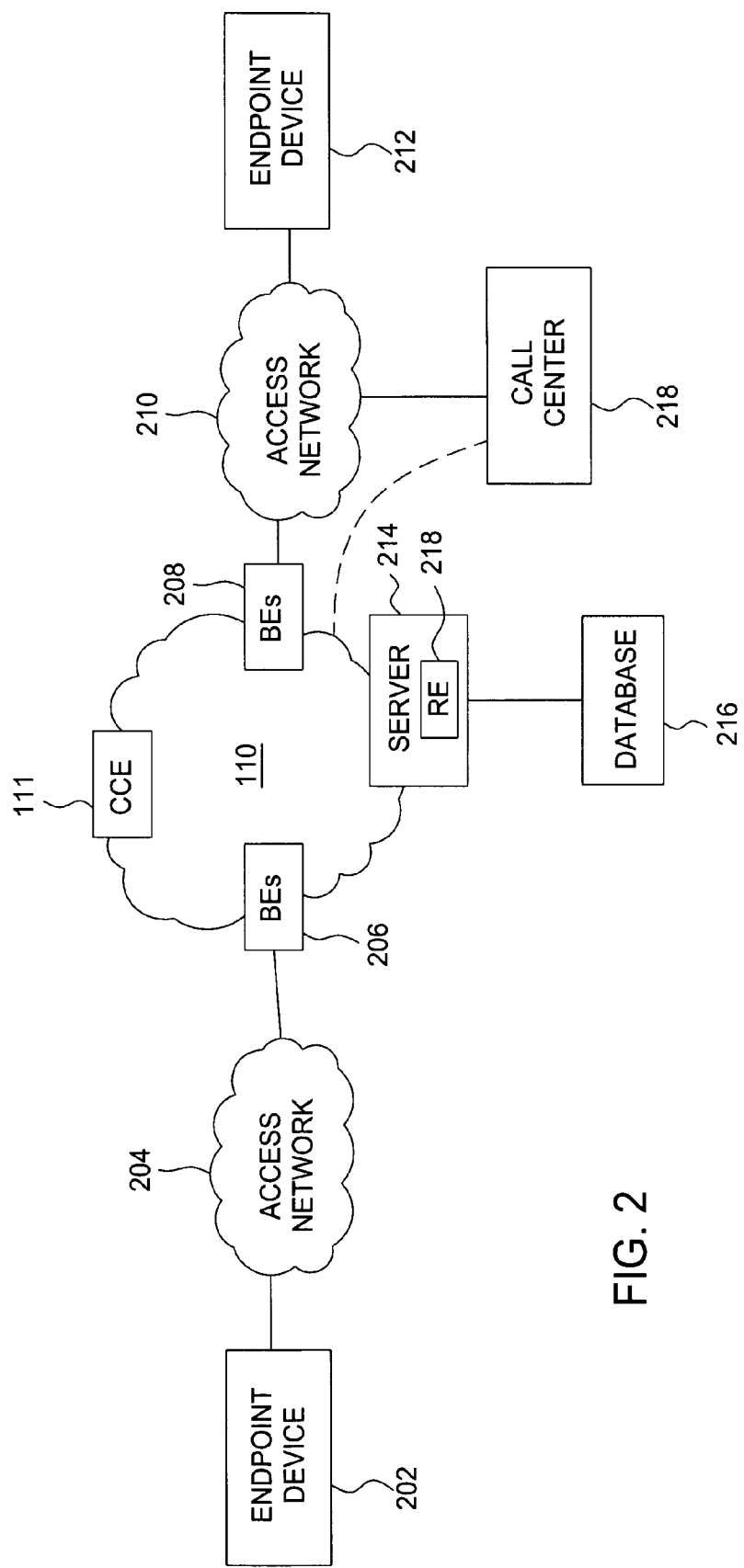
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and one or more border elements (BEs) 206. An endpoint device 212 is configured for communication with the core network 110 via an access network 210 and one or more BEs 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc). Although FIG. 2 only depicts individual components of the network (e.g., a single endpoint device, access network, and the like), it is understood by one skilled in the art that a plurality of such components may be implemented to form a larger network.

The core network 110 further includes a server 214 in communication with a database 216. In one embodiment of the present invention, the server 214 comprises a network routing engine 218 (or is a server that executes routing software) and is responsible for receiving and executing routing requests from the CCE 111. In another embodiment, the network routing engine is contained within the CCE 111 instead of a stand-alone network server 214. The database 216 may be any type of electronic collection of data that is well known in the art. In one embodiment, the database 216 stores a select listing of local telephone numbers that are associated with various business entities. A call made to any of these numbers is typically routed to a central call center 218 by the CCE or the routing engine. Similarly, the database 216 keeps records as to how data can be electronically transferred to each respective business entity (e.g., via e-mail, IP address, direct network connection, etc.).

In one embodiment, the call center 218 may comprise a centralized center attended by at least one customer care agent or operator. Notably, these customer care agents are responsible for receiving the routed calls initially directed to the local business entities (via a local telephone number). Depending on the embodiment, the call center may be directly connected to the core VoIP network 110 or at least one access network (e.g., access network 210).

In one embodiment, the present invention generally operates in the following manner. The CCE 111 initially receives a request from an endpoint device to establish a connection with a particular local entity (e.g., a local business) via a dialed local telephone number. Namely, it would appear to a user that he or she is calling a local business entity, e.g., a local pizzeria. Depending on the embodiment, a local telephone number may be construed to possess a particular area code and/or exchange code. After receiving this call request, the CCE 111 recognizes the "requested" telephone number (using database 216) and routes the call to a call center 218. A routed call is typically answered by a customer care agent, but may be received by a specialized computer. The care agent (or computer) then obtains transaction data (e.g., order and delivery information, such as address or phone numbers) from the caller. Once the agent has acquired the necessary transaction information, this data is recorded in a transactional record, which is an electronic form that can be readily transmitted over an IP network. The transaction record is then forwarded to the appropriate local entity by the server 214. In one example, the server 214 accomplishes this task by referencing the database 216 to determine the IP address of the local business entity that corresponds with the local phone number originally dialed by the customer.

Figure 3:
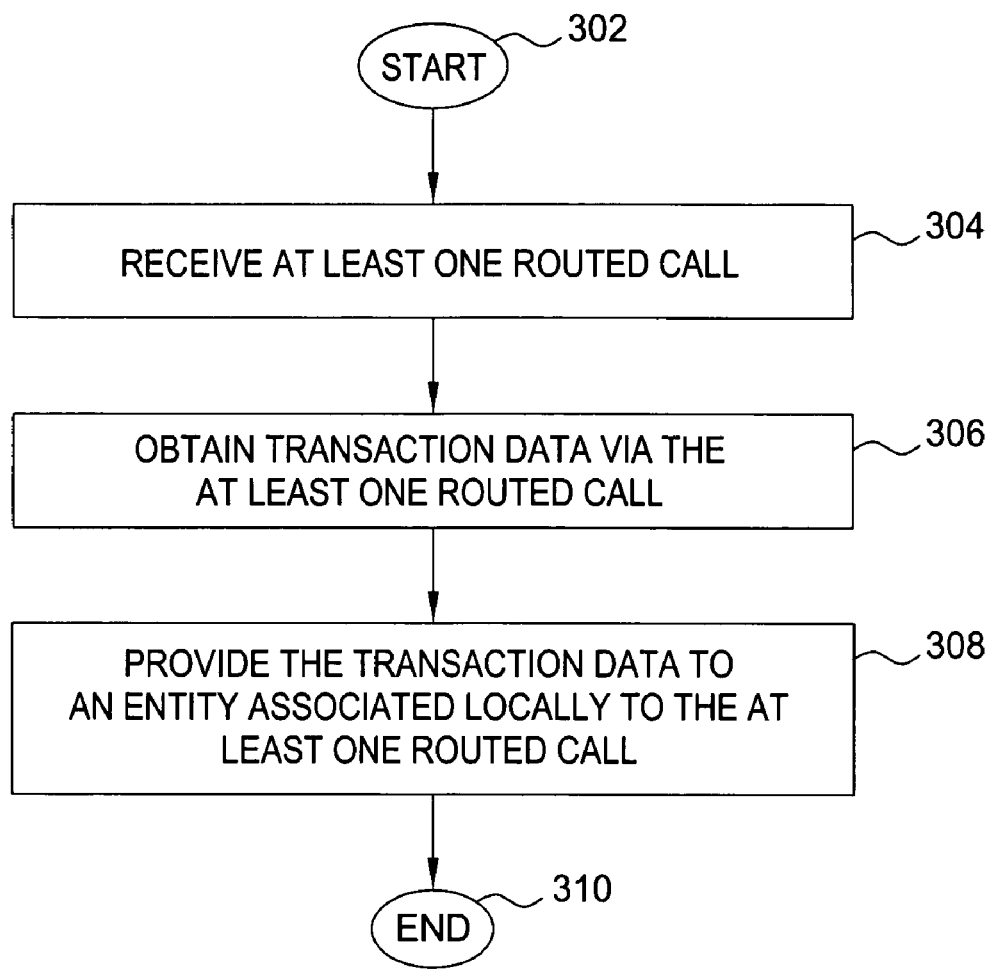
FIG. 3 is a flow diagram depicting an exemplary embodiment of a method for providing transaction data in a packet network in accordance with one or more aspects of the invention.

FIG. 3 is a flow diagram depicting an exemplary embodiment of a method 300 for transferring transaction data in a packet network as related to one or more aspects of the invention. The method 300 begins at step 302 and proceeds to step 304 where at least one routed call is received. In one embodiment, a call is initially directed to a local presence (e.g., a business entity, such as a store, restaurant, pizza delivery, or other place of business that is physically local to the caller) by a customer who dials a local telephone number.

In addition, it should be noted that "local" does not necessarily mean that the business entity is in the same town as the caller. Instead, "local" is defined as a locality that the business entity will likely service the request of the caller. However, "local" may be relative in relation to the business entity. For example, a business such as DOMINO'S PIZZA may only cater to a smaller "local" service area, e.g., a small town. Conversely, a business like THE HOME DEPOT may provide services to a much larger locality, such as an entire county. Therefore, a "local" area may comprise an area such as a town, township, borough, municipality, county and the like as well as neighboring or adjacent areas (i.e., town, borough, etc.). These "local" areas can typically be defined by referencing the area code and/or the exchange code of the local number being dialed as well as area and/or exchange codes that pertain to adjacent areas. For instance, a given town may be defined by an entire exchange code, but the nearest HOME DEPOT resides in an adjacent town that is classified by a different exchange code. However, the present invention may utilize a database (e.g., database 216) that establishes or defines two or more exchange codes of adjacent towns (or counties) as being "local" (e.g., the exchange codes of adjacent towns A and B are defined in the database as being "local" to each other).

The call is then transparently routed to a central office (which may be located a great distance away from the local business entity) by a CCE via a routing engine where it is received by a customer agent. Alternatively, the call may be received by an automated system, e.g., a computer with voice recognition capabilities.

At step 306, transaction data is obtained via the at least one routed call. In one embodiment, a customer agent (or computer) answers the routed call and obtains the transaction data from the caller. The transaction data may comprise of order information, delivery information, billing information, and the like. For example, if the caller initially called a pizzeria, the transaction data may include the type of pizza ordered and the caller's home address.

At step 308, the transaction data is provided to an entity associated to the at least one routed call. In one embodiment, the customer care agent (or computer) enters the transaction information (provided by the customer in step 306) into a transactional record. This transactional record may comprise an electronic based form that details the transaction data. The transactional record is then submitted electronically to the appropriate business entity. This business entity is designated by the CCE which analyzes the original telephone number that was dialed and ultimately routed to the central office. More specifically, the database contains records that include local telephone numbers that are mapped or associated with various business entities. For example, suppose the telephone number 732-555-1234 is associated with a particular local business e.g., the number is dialed to contact the local business). Once the number is dialed and the call is routed to the central office (which may be located in an area that is remote from Shrewsbury, N.J., such as Chicago, Ill.), the server may utilize the database 216 to ascertain that the telephone number is associated with a local business in Shrewsbury, N.J. With this information, the server then references the database to ascertain the manner in which the transactional record may be electronically submitted to the business entity that is "local" to Shrewsbury, N.J. Once equipped with this data the server provides the transaction data to the appropriate business entity in the prescribed manner. The method 300 continues to step 310 and ends.

Figure 4:
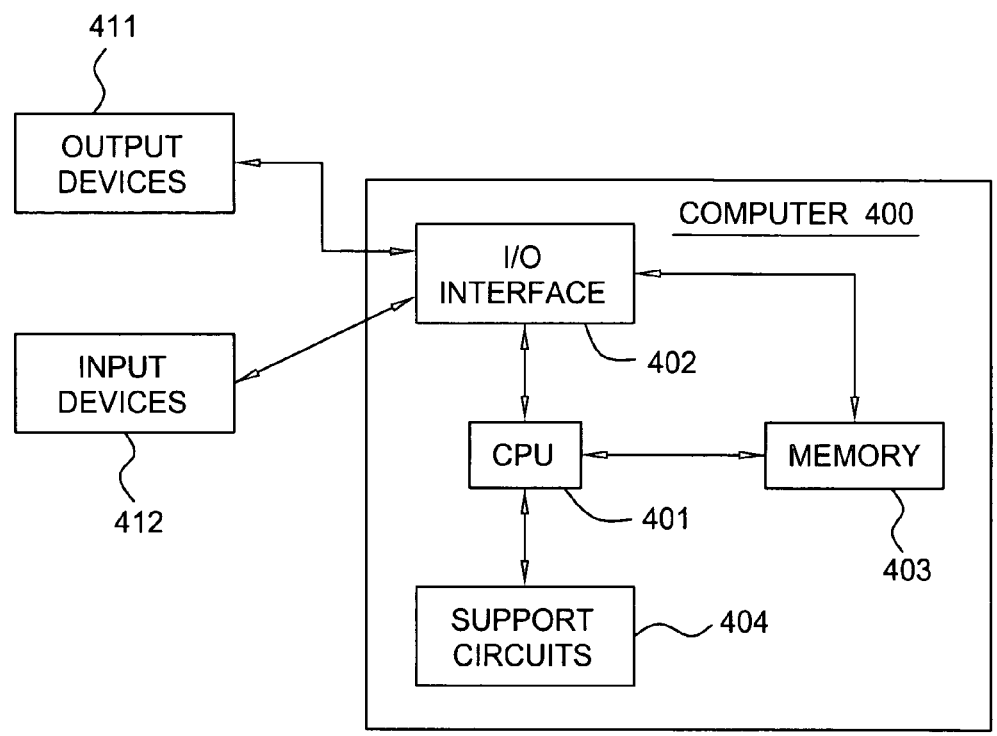
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. The computer 400 may be used to implement the server 214 of FIG. 2. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, display, and the like.

The memory 403 may store all or portions of one or more programs and/or data to implement the processes and methods described herein. Notably, the memory 403 may store data provisioning software for providing transaction data, as described above. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method for providing transaction data in a packet network, comprising:
 receiving a call containing the transaction data;
 obtaining the transaction data from the call, wherein the obtaining is performed by a computer of a telecommunications service provider that operates the packet network; and
 providing the transaction data to an entity associated locally to the call, wherein the entity associated locally to the call comprises a business entity that will provide a service associated with the transaction data for a locality associated with the call.

2. The method of claim 1, wherein the packet network comprises an internet protocol network.

3. The method of claim 1, wherein the call is received by a call center.

4. The method of claim 1, wherein the entity is associated with a telephone number that initiates the call.

5. The method of claim 4, wherein the entity is associated with a locality code of the telephone number.

6. The method of claim 1, wherein the transaction data comprises order information.

7. The method of claim 1, wherein the entity comprises a local presence.

8. The method of claim 1, wherein the call was directed to a local telephone number.

9. A non-transitory computer readable medium having stored thereon instructions that, when executed by a processor, causes the processor to perform a method for providing transaction data in a packet network, comprising:
 receiving a call containing the transaction data;
 obtaining the transaction data from the call, wherein the obtaining is performed by a computer of a telecommunications service provider that operates the packet network; and
 providing the transaction data to an entity associated locally to the call, wherein the entity associated locally to the call comprises a business entity that will provide a service associated with the transaction data for a locality associated with the call.

10. The non-transitory computer readable medium of claim 9, wherein the packet network comprises an internet protocol network.

11. The non-transitory computer readable medium of claim 9, wherein the call is received by a call center.

12. The non-transitory computer readable medium of claim 9, wherein the entity is associated with a telephone number that initiates the call.

13. The non-transitory computer readable medium of claim 12, wherein the entity is associated with a locality code of the telephone number.

14. The non-transitory computer readable medium of claim 9, wherein the transaction data comprises order information.

15. The non-transitory computer readable medium of claim 9, wherein the entity comprises a local presence.

16. The non-transitory computer readable medium of claim 9, wherein the call was directed to a local telephone number.

17. An apparatus for providing transaction data in a packet network, comprising:
 a computer comprising a processor, and
 a computer readable medium in communication with the processor, the computer readable medium has stored thereon instructions that, when executed by the processor, cause the processor to perform a method, comprising:
  receiving a call containing the transaction data;
  obtaining the transaction data from the call, wherein the computer is operated by a telecommunications service provider that operates the packet network; and
  providing the transaction data to an entity associated locally to the call, wherein the entity associated locally to the call comprises a business entity that will provide a service associated with the transaction data for a locality associated with the call.

18. The apparatus of claim 17, wherein the packet network comprises an internet protocol network.

19. The apparatus of claim 17, wherein the entity is associated with a telephone number that initiates the call.

20. The apparatus of claim 17, wherein the entity comprises a local presence.

* * * * *